United States Patent
Boucadair

(10) Patent No.: US 7,990,892 B2
(45) Date of Patent: Aug. 2, 2011

(54) METHOD OF SELECTING A TELEPHONY ROUTE WITHIN AN IP TELEPHONY DOMAIN, AND CORRESPONDING APPARATUS AND COMPUTER PROGRAM

(75) Inventor: Mohamed Boucadair, Caen (FR)

(73) Assignee: France Telecom, Paris (FR)

( * ) Notice: Subject to any disclaimer, the term of this patent is extended or adjusted under 35 U.S.C. 154(b) by 260 days.

(21) Appl. No.: 12/298,000

(22) PCT Filed: Apr. 20, 2007

(86) PCT No.: PCT/FR2007/051149
§ 371 (c)(1),
(2), (4) Date: Oct. 21, 2008

(87) PCT Pub. No.: WO2007/122353
PCT Pub. Date: Nov. 1, 2007

(65) Prior Publication Data
US 2009/0086724 A1      Apr. 2, 2009

(30) Foreign Application Priority Data

Apr. 21, 2006   (FR) ..................................... 06 03622

(51) Int. Cl.
*H04L 12/28* (2006.01)
*G06F 15/173* (2006.01)
(52) U.S. Cl. ........................................ 370/254; 709/241
(58) Field of Classification Search .................. None
See application file for complete search history.

(56) References Cited

U.S. PATENT DOCUMENTS

| | | | |
|---|---|---|---|
| 6,584,093 B1 * | 6/2003 | Salama et al. | 370/351 |
| 6,741,585 B1 * | 5/2004 | Munoz et al. | 370/352 |
| 7,565,448 B1 * | 7/2009 | Schlesener et al. | 709/242 |
| 2002/0145975 A1 * | 10/2002 | MeLampy et al. | 370/235 |
| 2005/0188106 A1 | 8/2005 | Pirbhai et al. | |
| 2006/0098577 A1 | 5/2006 | MeLampy et al. | |
| 2006/0200579 A1 * | 9/2006 | Vasseur et al. | 709/238 |
| 2006/0262776 A1 * | 11/2006 | Pollock | 370/352 |
| 2009/0080414 A1 * | 3/2009 | Boucadair et al. | 370/352 |
| 2009/0175266 A1 * | 7/2009 | Boucadair et al. | 370/352 |
| 2009/0175267 A1 * | 7/2009 | Boucadair et al. | 370/352 |
| 2010/0091976 A1 * | 4/2010 | Boucadair | 379/221.03 |

OTHER PUBLICATIONS

International Search Report of Counterpart Application No. PCT/FR2007/051149 Filed on Apr. 20, 2007.

(Continued)

*Primary Examiner* — Ayaz R Sheikh
*Assistant Examiner* — Timothy J Weidner
(74) *Attorney, Agent, or Firm* — David D. Brush; Westman, Champlin & Kelly, P.A.

(57) ABSTRACT

A method is provided for selecting a telephony route for at least one digital stream serving a telephony destination. The method is performed within a first location server belonging to a first IP telephony domain deployed on at least one autonomous system. The autonomous system exchanges IP routing information with its neighbors designating at least one IP destination for updating an IP routing table. The method includes: the first location server searching for the IP routing information, the IP routing information including an identifier of a second IP telephony domain having associated therewith the at least one IP telephony destination, referred to as the destination identifier; and selecting the IP telephony route to reach the at least one telephony destination, applying a predetermined criterion for selecting the second telephony domain as a function of the destination identifier.

8 Claims, 6 Drawing Sheets

OTHER PUBLICATIONS

Schlesener, M.C. et al.: "Performance Evaluation of Telephony Routing Over IP (TRIP)", IP Operations & Management, 2003. (IPOM 2003). 3rd IEEE Workshop on Oct. 1-3, 2003, Piscataway, NJ, USA, IEEE, Oct. 1, 2003, pp. 47-53.

Rosenberg et al. .: "Telephony Routing Over IP (TRIP)", IETF Standard, Internet Engineering Task Force, IETF, CH, Jan. 2002.

Office Action dated Sep. 16, 2010 from corresponding U.S. Appl. No. 12/297,985.

Rosenberg, J. et al., "Usage of TRIP in Gateways for Exporting Phone Routes", IETF Standard-Working Draft, Internet Engineering Task Force, IETF, CH, No. 3, Nov. 2001.

Rosenberg, J. et al., "A Framework for Telephony Routing Over IP", IETF Standard, Internet Engineering Task Force, IETF, CH, Jun. 2000.

International Search Report and Written Opinion, dated Oct. 3, 2007 for corresponding International Application No. PCT/FR2007/051147, filed Apr. 20, 2007.

U.S. Appl. No. 12/297,985, dated Sep. 26, 2010—Office Action

U.S. Appl. No. 12/297,985, dated Apr. 19, 2011—Final Office Action.

Final Office Action dated Apr. 19, 2011 for corresponding U.S. Appl. No. 12/297,985, filed Oct. 21, 2008.

* cited by examiner

METHOD OF SELECTING A TELEPHONY ROUTE WITHIN AN IP TELEPHONY DOMAIN, AND CORRESPONDING APPARATUS AND COMPUTER PROGRAM

CROSS-REFERENCE TO RELATED APPLICATIONS

This Application is a Section 371 National Stage Application of International Application No. PCT/FR2007/051149, filed Apr. 20, 2007 and published as WO 2007/0122353 on Nov. 1, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of telephony over Internet type networks. The term telephony is used not only to cover conventional telephone services, but also services incorporating advanced services such as videophones or the synchronous digital transfer service.

The present disclosure relates more particularly to exchanging information so as to enable synchronization to be achieved between the service layer (i.e. the layer concerned with routing the call) and the network layer (i.e. the layer concerned with transferring IP datagrams) for the purpose of routing information streams between IP telephony domains.

The IP network is the backbone network adopted by operators for pooling the heterogeneous services they offer, including IP telephony, commonly referred to as voice over IP (VoIP), or more generally grouped under the heading of conversational services.

The deployment of these real time voice or video applications towards an all-IP network, and also the migration of the public switched telephone network (PSTN) thereto are constraining operators to provide global coverage for these services on a worldwide scale. This means that it is not sufficient to provide points of presence all over the globe, but that clients must be given the option of calling any destination (specifically clients of other operators). This global coverage can be achieved by establishing interconnection agreements with other third-party service providers in order to extend the scope of a service outside the administrative borders of a single service provider.

On these lines, it is expected that co-operation between providers of VoIP/ToIP (telephony over IP) services will intensify in the short and medium term. This intensification should enable traffic associated with voice to be delivered to termination points that lie outside the IP telephony administration domains (ITADs) of operators. Such co-operation between providers is of strategic important since conventional bilateral type agreements do not make it possible to obtain the global coverage that operators require.

In addition, offers of telephony deployed over an IP network need to satisfy quality constraints such as high availability and good tolerance to faults. The service availability constraint applies not only to the service layer, but also to the transport layer.

Below in this document, the terms "quality of service" and "QoS" are used interchangeably to designate the same concept. Reference is also made to the following terms:
- LS (location server): this is an entity of a telephone domain (ITAD) that manages the client locations and routes of a local ITAD. This equipment can interface with a neighboring LS in order to discover the locations of clients managed by other ITADs;
- AS (autonomous system): this is a set of IP resources managed by a single administrative entity, also referred to as an IP connectivity provider. In the context of the border gateway protocol (BGP, RFC1771) for routing between domains, each AS is identified by a unique identifier. Such an AS is also referred to as an IP transfer domain.

BACKGROUND OF THE DISCLOSURE

1. Prior Art

In "conventional" telephony mode (using the public switched telephone network (PSTN)), telephony operators establish bilateral agreements to extend the global coverage of the telephone service. The level of coverage achieved depends essentially on the number of agreements made. In outline, it can be considered that two categories of telecommunications operator are in existence: local and/or national operators, and global operators. The major global operators make a large number of agreements and can thus reach most existing destinations. Local operators make only a small number of agreements, including only one or two with major operators. Thus, a incumbent national operator in a developing country will make agreements with other national operators and one or two agreements with global operators in order to deliver calls to the rest of the world.

At present, most operators are migrating their PSTN networks to solutions and infrastructures that are based on the IP protocol. To accompany the deployment of VoIP services, the Internet engineering task force (IETF) has undertaken a large amount of standardization work. Several protocols have been specified, amongst which mention can be made of session initiation protocol (SIP), session description protocol (SDP), real-time transfer protocol (RTP), real-time transfer control protocol (RTCP), multimedia gateway control protocol (MGCP), session announcement protocol (SAP), and telephony routing over IP (TRIP, RFC3219). These protocols satisfy different requirements and in particular they incorporate call signaling and control, the exchange and control of media streams, and the exchange of call routing information.

TRIP enables interconnected ITADs to exchange all of the destinations they can reach, thereby acting in particular to facilitate the selection of the gateways that are the most appropriate for delivering IP telephony traffic to the PSTN. The TRIP protocol is implemented by location servers (LS) that propagate TRIP routes containing attributes that serve to describe the routes in question. The use of this particular protocol is independent of the type of signaling protocol deployed for actually setting up calls. The TRIP protocol can be used together with SIP, H.323, or any other signaling protocol. Each LS maintains a local routing database known as the telephony routing information database (TRIB). This routing database is fed with advertisements received from neighboring LSes (from another telephony domain, for example). The operation of the TRIP protocol is similar to that of the BGP protocol. Advertisements between neighboring LSes are made in the form of route update messages, referred to simply as update messages. These messages are defined by the TRIP protocol and they are exchanged between LSes in order to inform the LSes of the same domain or of a neighboring domain about routes that are available.

Activation of the TRIP protocol between various ITADs is described with reference to FIG. 1 (for reasons of simplicity, the term "domain" is also used to denote an ITAD), each ITAD being administered by a single IP telephony operator. Each of these operators has one or more LSes. Each LS maintains a routing database that it feeds with advertisements received from its neighbors (i.e. in other domains) and from LSes in its own domain. These advertisements are updated and forwarded to other neighbors when interconnection agreements permit this.

Thus, the LS of ITAD4 14, for example, updates the advertisements received from the LS of ITAD5 15 and re-propagates them to ITAD3 13. It should be observed that an ITAD is not necessarily deployed on a single AS or "IP transfer domain".

From the routing point of view, an LS handles three types of route:
- external routes, received from LSes situated in neighboring ITADs;
- internal routes, received from LSes situated in the same ITAD; and
- local routes, configured locally in each LS for injection into TRIP processes.

This operation is performed either by static configuration or by redistributing information coming from other routing protocols.

These routes are managed by the routing tables of a telephony routing information base (TRIB). Thus, four types of TRIB are managed by an LS, as is shown in FIG. 2. These tables exist in a single LS, and the relationship between the tables are described with reference to FIG. 2.

"Adj-TRIBs-In" 22: stores routing information conveyed by update messages. This routing information, also referred to as "routes", constitutes the input to a route selection process 21 (decision process). A given LS maintains an adjacent TRIB-In table 22 for each neighboring LS in which it stores all of the route advertisements received from an adjacent LS;

"Ext-TRIB" 24: only one external TRIB table is maintained by an LS. This table contains the results of a route selection process applied to external routes 25 (Adj-TRIBs-IN) and local routes 26. Prior art techniques enable only one route to be selected per destination;

"Loc-TRIB" 20 ("local TRIB"): this table contains the local routes that result from applying routing policies that are local to each LS; and "Adj-TRIBs-Out" 23 (adjacent TRIBs out): these are the routes that the local LS will advertise to its peers.

In the transport layer, it is possible to use the QoS-enhanced border gateway protocol (q-BGP) in order to be aware of the QoS treatment to which the voice streams will be subjected by the transport layer.

2. Drawbacks of the Prior Art

A drawback of that prior art technique is associated with the lack of synchronization between the service layer and the network layer when routing media streams. In the context of deploying the TRIP protocol between neighboring ITADs, the media streams follow either the path determined by IP routing protocols such as the BGP protocol, or the path imposed by the telephony platforms of each ITAD. Routing within ITAD platforms requires the content of the SDP portion of messages to be modified several times, e.g. when using the SIP protocol.

A corresponding drawback of those prior art transfer techniques stems from the way ASes process media streams. Since such streams follow a path that is determined by the BGP protocol, the ITAD has no control over the path taken by the stream. Thus, it can happen that streams follow a path that is optimized within ITADs (e.g. for best QoS), but not at the level of paths between ASes. This can make the negotiations and the agreements between neighboring ITADs worthless if the QoS clauses are not satisfied.

In the context of a static configuration for the AS path to be followed by media stream, this possibility makes it necessary (e.g. in the context of using the TRIP protocol and while actually transferring streams) to modify the content of the SDP portion of SIP messages several times. This processing can lead to additional delays when it is necessary to pass through a plurality of ASes, and that can harm the quality of service as perceived by the final client.

Another drawback in that prior art technique is associated with the AS loop or spiral phenomenon. This AS spiral phenomenon is described with reference to FIG. 3.

An AS spiral occurs when, after negotiation between ITADs for routing a media stream, the stream passes more than once through a single AS prior to reaching its destination. Assume that ITAD1 311 uses AS1 321 to deliver its voice traffic, that ITAD2 312 uses AS2 322, that ITAD3 313 uses AS1 321, that ITAD4 314 uses AS4 324, that ITAD5 315 uses AS3 323, and that ITAD6 316 uses AS6 326. Also assume that the best route for reaching D 302 from S 301 is to pass via {AS1, AS4, AS5, AS6}.

Assume that a client S 301 seeks to place a call with D 302 and that ITAD1 311 selects a route passing via ITAD2 312 and ITAD3 313 in order to reach ITAD6 316 to which the destination D 302 is attached. This telephone level route assumes that there exists an IP route (in the transfer layer) passing through the domains: AS1, AS2, AS1, AS6. It can be seen that the call passes more than once through a single AS, specifically AS1. This constitutes a spiral at IP level and can be harmful to IP transfer performance since AS1 is passed through more than once. This phenomenon can nevertheless be avoided if the media streams follow the BGP path as opposed to the path imposed by the service platforms.

In order to illustrate this phenomenon once more, assume now that the path selected by ITAD1 for reaching D is {ITAD1, ITAD4, ITAD5, ITAD6}. This means that the AS path followed will be {AS1, AS4, AS3, AS6}. Unfortunately there is no direct link between AS4 and AS3. Thus this AS path becomes either {AS1, AS4, AS5, AS5, AS3, AS6} or else {AS1, AS4, AS1, AS2, AS3, AS6}. In either case, these paths are not optimum at IP transfer level and they are different from the paths selected by BGP.

Another drawback of that prior art technique is associated with the lack of synchronization between the service layer and the transfer plane. This phenomenon is described with reference to FIG. 4, in an IP telephony application.

It is assumed that ITAD1 is deployed on two ASes, AS1 and AS2, and that ITAD2 is deployed on the domain AS4, and that the two IP telephony operators managing the two ITADs, i.e. ITAD1 and ITAD2, have made an agreement for interconnecting their service platforms so as to extend the scope of their voice services with quality of service.

In order to deliver its voice traffic, ITAD1 relies on a premium class (i.e. a class that guarantees an IP transfer with a best quality of service, e.g. guaranteeing a loss rate of 99.999% and a maximum delay of less than 50 milliseconds (ms)) made available by AS1 and AS2; similarly, ITAD2 uses another premium class made available by AS4. At IP level, the IP network service providers exchange routing information to enable routes to be built up in QoS planes that are coherent and consistent. Thus, the premium class of AS4 is associated with the premium class of AS2 via a dedicated inter-domain route.

Thus, to reach C2 from C1, two best effort routes (i.e. routes available by activating a route protocol such as border gateway protocol (BGP) exist): the route that passes via AS1, AS2, and AS4, and the route that passes via AS1, AS3, and AS4. However only one premium route exists. This route passes via AS1, AS2, and AS4. To ensure coherent service, it is necessary for the voice traffic from C1 destined for C2 in the context of the telephony service made available by ITAD1 to use the premium route and not the best effort route. Unfortunately, unless a static configuration is implemented, there is no certain way for ITAD1 to ensure that it obtains a route passing via AS1, AS2, and AS4. Thus, it can very well happen, when media streams are actually transferred, that they pass via AS1, AS3, and AS4. This is due to the fact that the signaling protocol does not have a direct interface with the IP routing protocols that take charge of routing IP packets. Thus, the path of the signaling packets may be different from that of the media packets. Under such circumstances, the guarantees negotiated when setting up a call become obsolete.

In addition, those centralized and bilateral configuration techniques present the drawback of not satisfying coverage requirements since the number of agreements that need to be set up to provide global coverage becomes large.

What's more, bilateral agreements at service level are not sufficient for offering a quality of service. This is due to the fact that the quality of service perceived by the user also incorporates the quality of service delivered by the transfer layer. In order to make this mode viable, network operators must therefore set up IP connectivity agreements of the same kind, presenting the same level of quality of service. Unfortunately, given the large number of ASes (more than 17,000), such agreements cannot be put into place.

SUMMARY

An embodiment of the invention relates to a method of selecting a telephony route for routing a call to a telephony destination, the method being performed within a first location server belonging to a first IP telephony domain deployed on at least one autonomous system, said autonomous system exchanging with its neighbors IP routing information for at least one digital stream associated with said call, said information designating at least one IP destination for updating an IP routing table.

According to an embodiment of the invention, said method comprises the following steps:
  the first location server searching for said IP routing information, said IP routing information comprising an identifier of a second IP telephony domain having associated therewith said at least one IP telephony destination, referred to as the destination identifier; and
  selecting said IP telephony route to reach said at least one telephony destination, applying a predetermined criterion for selecting the second telephony domain as a function of said destination identifier.

Thus, when selecting telephony routes, it is possible to take account of IP routing information associated with the transfer layer. This enables the location server that carries out the selection to be informed by the autonomous system about the IP routes actually followed by the digital streams while they are being transferred. The autonomous systems communicate with one another specifying the IP routes, and the location servers can make use of this information for selecting telephony routes.

According to an original characteristic of an embodiment of the invention, said routing information comprises a list of identifiers of autonomous systems that are passed through in order to reach the telephony destination associated with said destination identifier, and the step of searching for said routing information consists in extracting from said routing table of said autonomous system said list of identifiers of autonomous systems that are passed through.

Thus, an embodiment of the invention enables the location server to access a routing table generated at transfer layer level. The server can thus discover the IP routes that have been selected for conveying the media streams to a telephony destination and can recover the list of autonomous systems that have been passed through.

According to an original characteristic of an embodiment of the invention, said method includes the following steps:
  receiving at least one route update message from a second location server, said message defining at least one updated telephony route comprising a list of identifiers of autonomous systems passed through and a list of IP telephony domains passed through from said telephony destination;
  extracting from said list of IP telephony domains, the identifier of an IP telephony domain with which said telephony destination is associated, referred to as the destination identifier;
  obtaining a set of at least one telephony route serving said telephony destination, as previously stored within said first location server;
  searching within said at least one autonomous system for at least one IP route for which said at least one IP destination is identical to said destination identifier, referred to as searched-for IP routes;
  selecting a telephony route within said set of telephony routes, for which a list of autonomous systems pass through includes the same autonomous system identifiers as said list of autonomous system identifiers of said at least one searched-for route, when such a route exists;
  selecting a telephony route from said set of telephony routes when there exists no route for which a list of autonomous systems pass through comprises the same autonomous system identifiers as said list of autonomous system identifiers, in application of at least one predetermined criterion; and
  storing said selected telephony route.

The location server selecting the route thus implements the method that makes it possible to select a route that takes account of routing information. This method is based on the location server receiving route update messages. These messages contain a list of autonomous system identifiers inserted in the telephony route.

Thus, the telephony route includes information identifying the IP route followed. The location server recovers the identifier of the destination telephony domain and obtains a telephony route list serving that destination. This enables it to search within its own autonomous system for at least one IP route (at transfer level) that serves said destination. The system can thus select a route in application of two selection techniques or criteria:
  if within the set of telephony routes it identifies a route for which the list of autonomous systems passed through has the same autonomous system identifiers as the list of autonomous system identifiers of the looked-for route, then it selects this identified route;
  otherwise it selects a route that serves the same destination using some other criterion. For example this may be the first telephony route it finds.

Thereafter the server stores this selected route. It is used subsequently for routing the data streams during a routing process.

According to a particular aspect of the invention, such a method includes a step of sending at least one route update message to a location server, said message defining at least one updated telephony route comprising at least one identifier of at least one autonomous system and at least one identifier of at least one IP telephony domain.

Thus, the location server keeps its peers informed about the selection it has carried out. The other location servers are thus in a position to make use of and take account of said route.

According to a particular characteristic of an embodiment of the invention, such a method includes the following steps:
- receiving at least one route update message from a second location server situated in said first telephony domain, said message defining at least one updated telephony route comprising a list of identifiers of autonomous systems passed through and a list of IP telephony domains passed through from said destination; and
- storing at least one updated telephony route.

The location server thus has the capacity to receive telephony routes updated by its peers situated in the same telephony domain as itself. It can thus store this route immediately.

According to a particular aspect of the invention, said list of identifiers of autonomous systems is ordered in application of at least one predetermined ordering criterion, and said selection step takes account of said at least one predetermined ordering criterion.

The list of identifiers enables the location server to identify the autonomous systems through which the telephony route passes. For a given route, this list may be ordered, e.g. for example specifying the order in which the digital stream passes through the autonomous systems. This enables the location server to know the ordering criteria and the order given to the autonomous systems of the route. Selection of the telephony route by the autonomous system may take account of this ordering, e.g. for the purpose of optimizing the telephony path.

According to an original characteristic of an embodiment of the invention, said list of autonomous server identifiers is not ordered, and said selection step takes account of the first identifier in said list of autonomous system identifiers.

When the list is not ordered, the selection step of the method implemented by the location server takes account only of the first identifier in the list. Thus, even if a location server transmits a route that is not ordered, the location server that processes this information is in a position to select a route on the basis of the route supplied thereto by the update message.

An embodiment of the invention also provides apparatus for selecting a telephony route for routing a call to a telephony destination within a first location server belonging to a first IP telephony domain deployed on at least one autonomous transfer system, said autonomous system exchanging with its neighbors IP routing information for at least one digital stream associated with said call, said information designating at least one IP destination for updating an IP routing table.

According to an embodiment of the invention, said apparatus comprises means for:
- searching for said IP routing information, said IP routing information comprising an identifier of a second IP telephony domain with which said at least one IP telephony destination is associated, referred to as the destination identifier; and
- selecting said IP telephony route to reach said at least one telephony destination in application of a predetermined second telephony domain selection criterion, as a function of said destination identifier.

More generally, such apparatus includes means for implementing the steps of the telephony route selection method of an embodiment of the invention as described above.

In another embodiment, the invention also provides a computer product program downloadable from a communications network and/or stored on a computer-readable medium and/or executable by a microcomputer.

According to the invention, in at least one embodiment, such a computer program product includes program code instructions for executing the telephony route selection method as described above.

An embodiment of the invention also provides a propagation signal for implementing the method of propagating routes.

According to an embodiment of the invention, such a signal comprises a route update message as described above and containing data representative of a list of autonomous system identifiers that have been passed through and a list of IP telephony domains that have been passed through from said destination.

BRIEF DESCRIPTION OF THE DRAWINGS

Other characteristics and advantages appear more clearly on reading the following description of a preferred implementation given merely by way of non-limiting illustrative example, and from the accompanying drawings, in which.

DETAILED DESCRIPTION OF ILLUSTRATIVE EMBODIMENTS

1. Recap of the Principle of an Embodiment of the Invention

An embodiment of the invention thus proposes achieving synchronization between the transfer layer and the service layer so as to avoid AS spiral phenomenon and degradation of quality of service.

Figure 1:
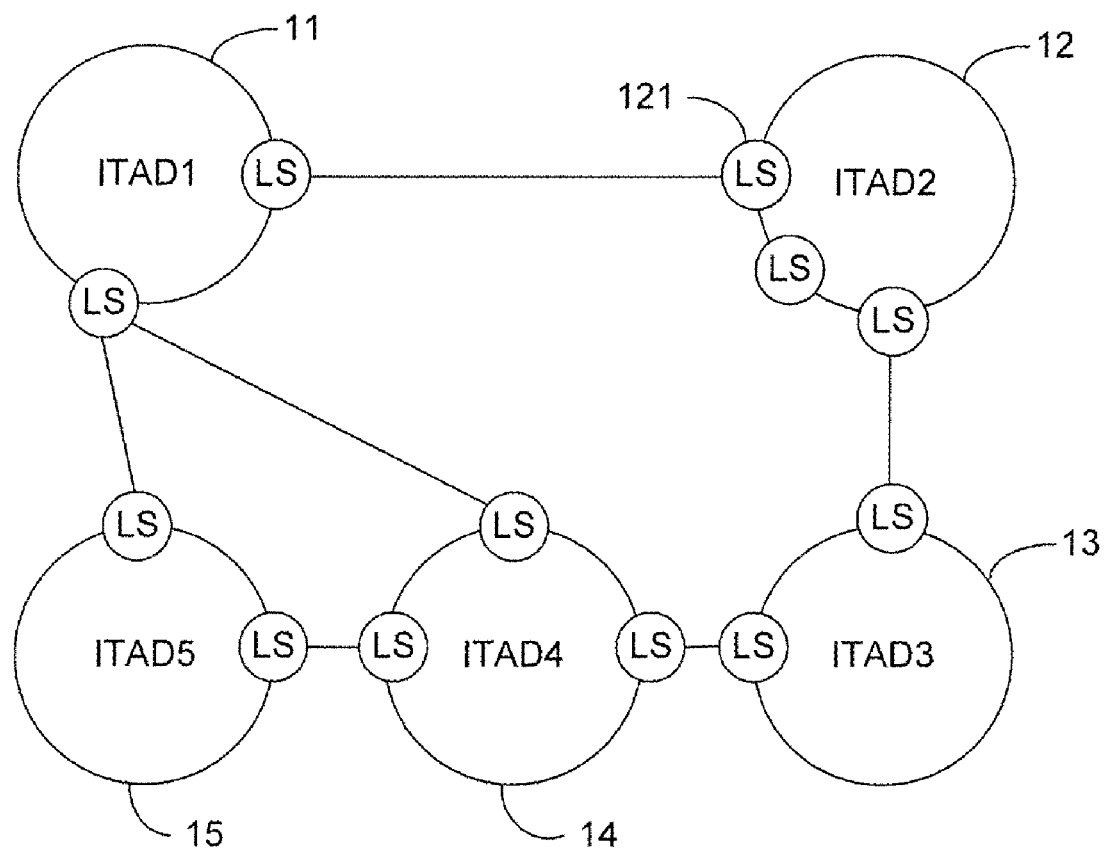
FIG. 1, described above, shows an example of architecture for telephony domains (ITADs)
Figure 2:
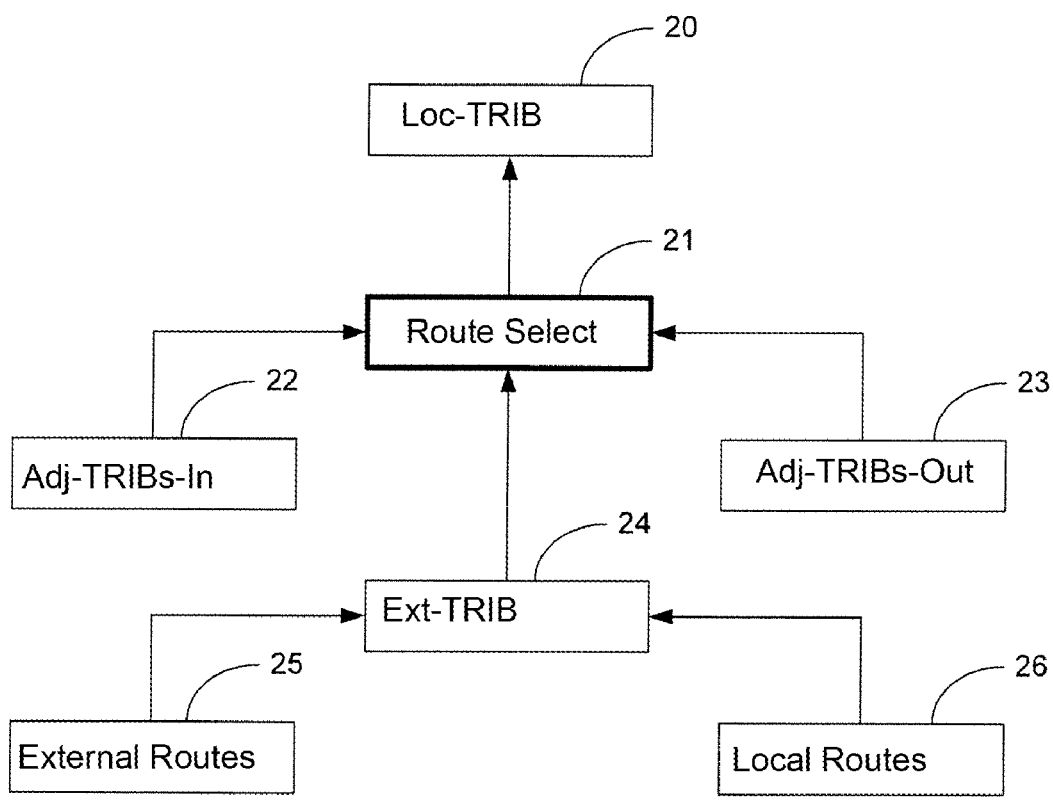
FIG. 2 shows the structure of routing databases (TRIBs) used by location servers (LSes) routing calls in the telephony domains (ITADs) shown in FIG. 1.
Figure 3:
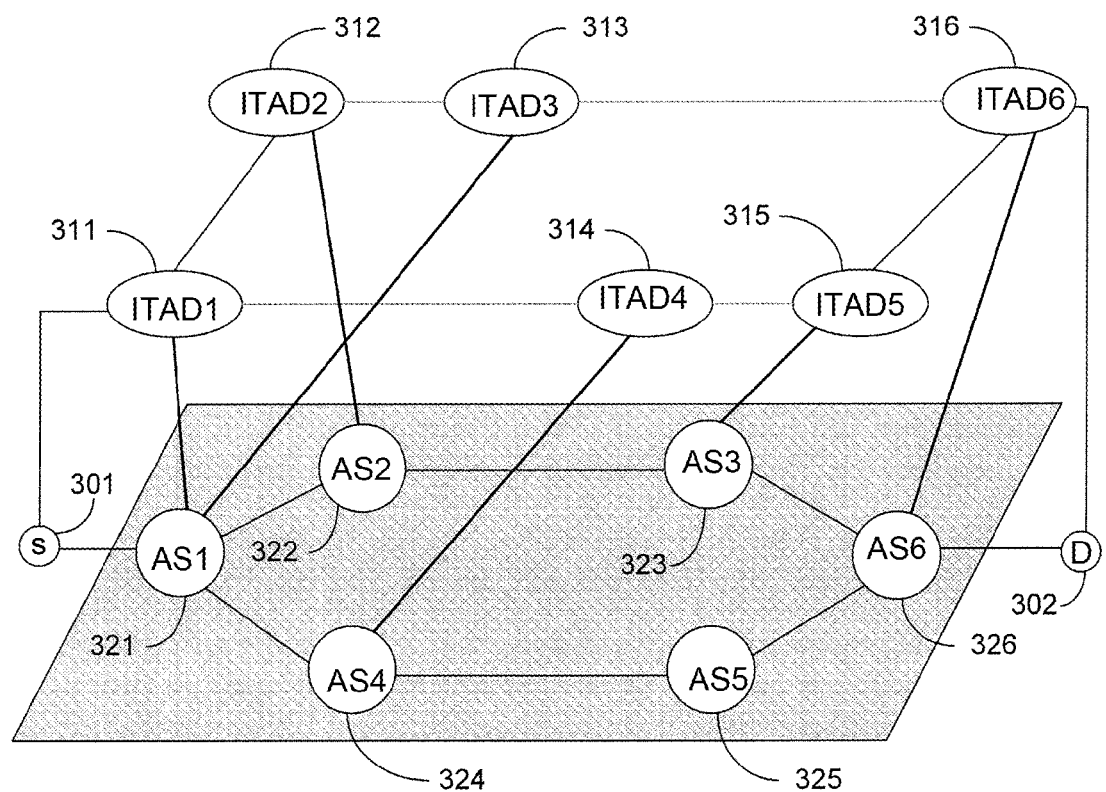
FIG. 3 describes the AS spiral phenomenon that can occur when selecting a telephony route using prior art techniques.
Figure 4:
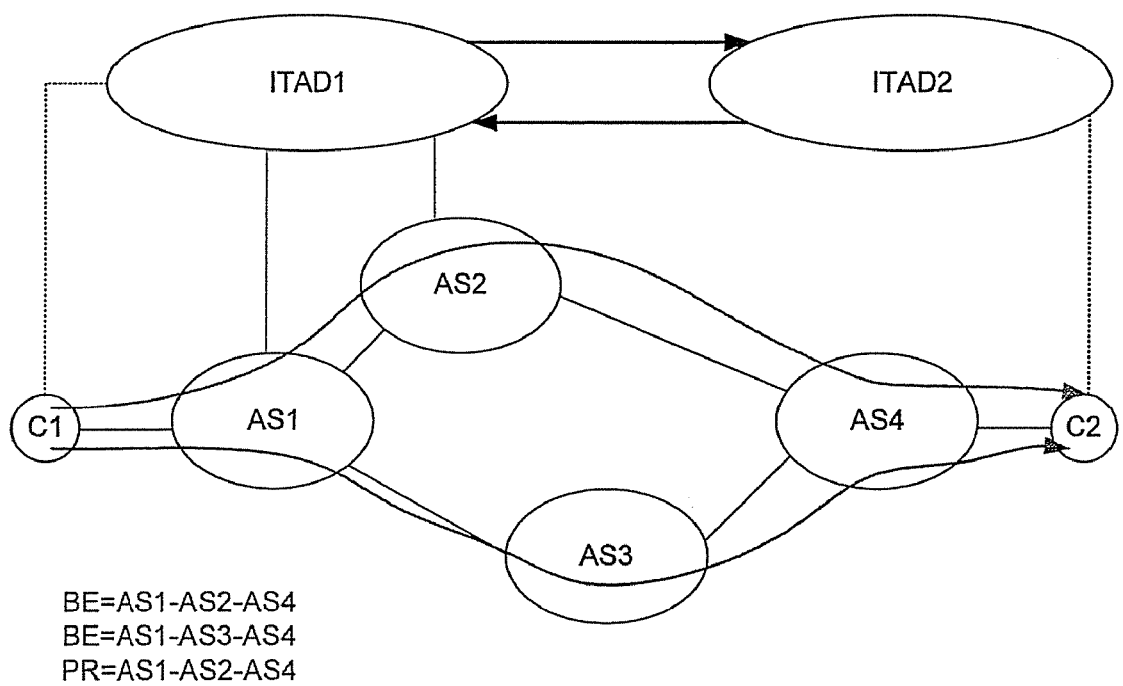
FIG. 4 shows the need to obtain synchronization between the transport layer and the service layer.
Figure 5:
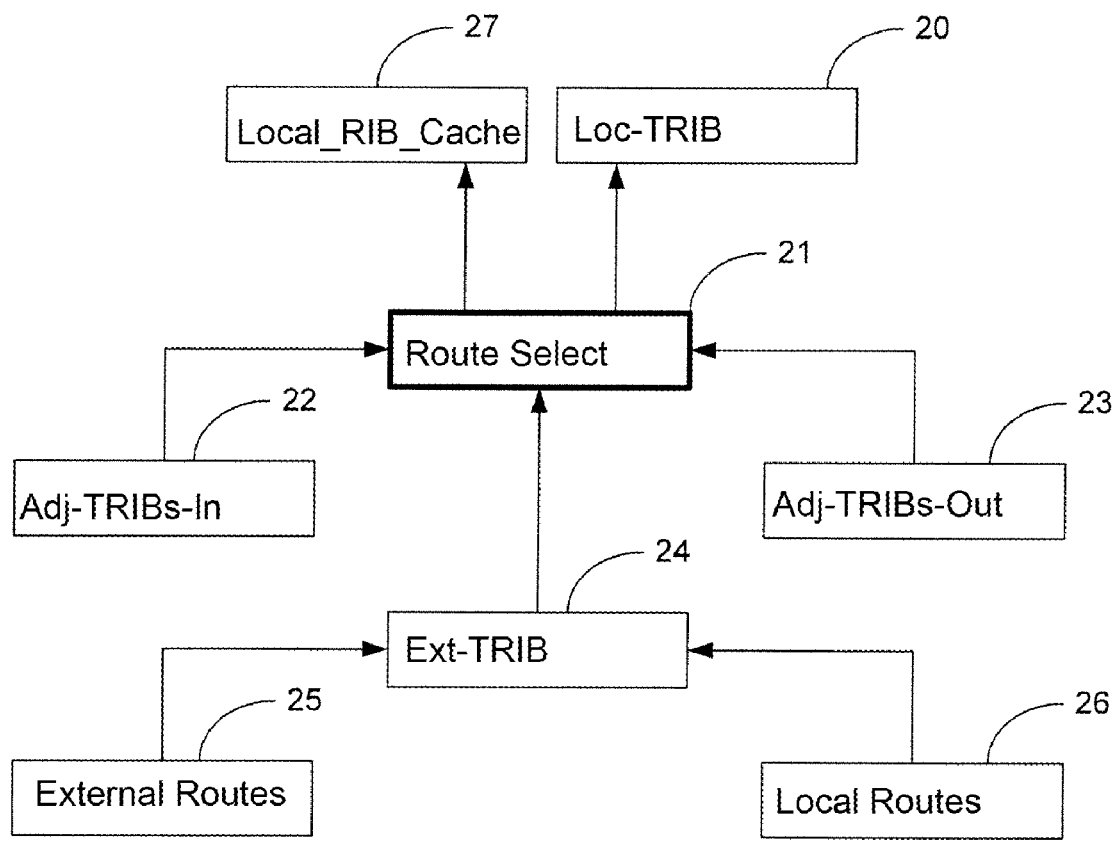
FIG. 5 describes the novel architecture for the routing database of an LS in accordance with an embodiment of the invention.

The general principle of an embodiment of the invention relies on an ITAD, when selecting a route for serving a given destination, taking account of new routing parameters associated in particular with the ASes through which the media streams pass. This is made possible by modifying the structure of the database for managing routing information (TRIB). With reference to FIG. 5, there follows a description of the new organization of TRIP routing tables.

"Adj-TRIBs-In" 22: stores routing information conveyed by update messages. This routing information, also referred to as "routes", constitutes the input to a route selection process 21 (decision process). A given LS maintains an adjacent TRIB-In table 22 for each neighboring LS in which it stores all of the route advertisements received from an adjacent LS;

"Ext-TRIB" 24: only one external TRIB table is maintained by an LS. This table contains the results of a route selection process applied to external routes 25 (Adj-TRIBs-IN) and local routes 26. Prior art techniques enable only one route to be selected per destination;

"Loc-TRIB" 20 ("local TRIB"): this table contains the local routes that result from applying routing policies that are local to each LS; and "Adj-TRIBs-Out" 23 (adjacent TRIBs out): these are the routes that the local LS will advertise to its peers.

A new table is introduced called "Local_RIB_Cache" 27. This cache is provided by the IP connectivity provider (the administrative entity managing an AS) in the form of a set of authorizations for accessing routing tables or indeed by means of a "looking glass" (a method of enabling IP routes to be visualized on the IP Internet backbone).

By way of example, this table may be a copy of the route information base (RIB) routing tables of the autonomous system border routers (ASBRs) of the AS managed by the IP network service provider in question.

By way of example, this new table is used by a TRIP route selection process in order to ensure synchronization between the transport layer and the service layer.

2. Description of an Implementation

In the standard version of the TRIP protocol, provision is made to exchange routing information between two neighboring LSes with the help of an update message. The update message contains a certain number of attributes. One of these attributes known as "TRIP Route" contains the routes associated with given destinations. The prior art allows only one route to be advertised per destination since the conventional route selection process cannot select more than one route (also known as the best route).

Each "TRIP route" is associated with specific route attributes such as the ITAD path (the two attributes that give this type of information are "AdvertisementPath" and "RoutedPath"), the next hop (given by the "NextHopServer" attribute), etc.

In order to enable synchronization between the service layer and the transport layer, the following configuration procedure is implemented:

each ITAD has an identifier in the form of an AS number or a routable IP address;

this identifier is the same as that used by the TRIP protocol for providing the "AdvertisementPath" and "RoutedPath" attributes;

the identifiers of the ITADs are advertised in an inter-domain routing protocol such as BGP or q-BGP. These identifiers need not be the true IP addresses of the LSes;

each IP connectivity service provider (administrative entity managing an AS) provides IP telephony operators (managing an ITAD) with an interface or a cache for its local routing table (Local_RIB_Cache) provided by an inter-domain routing protocol such as BGP or q-BGP. This cache is updated at the request of IP telephony service provides or dynamically by means of some other mechanism;

the spirals that might be created at IP level are eliminated at service layer level by each LS activating a mechanism that identifies the ASes passed through by a given route (cf. 5.4). Thus, the TRIP routes no longer contain additional AS spirals.

Thereafter, the following route selection procedure is applied:

on receiving a TRIP update message from a neighboring LS, the local LS extracts:

the last element of the "RoutedPath" attribute for each "TRIP route" contained in the update message. This element is the identifier of the ITAD that is associated with the prefix of the route in question, and it is written ITADid. For all routes that serve the prefixes attached to the same ITAD, ITADid is identical; and the domain of the route, written DEST;

the local LS interrogates the local RIB inter-domain cache (i.e. Local_RIB_Cache) in order to discover the path for reaching ITADid. If a route exists, then the LS extracts the BGP "AS_PATH" attribute (this attribute is specific to BGP, it provides the list of IP domains through which the BGP route in question passes);

if the "AS_PATH" attribute is of the "AS_SET" type (i.e. not ordered), then the local LS searches its "Adj_TRIB_In" for the existence of other routes to DEST, presenting a list of the ASes used for routing voice traffic that presents characteristics identical to the elements of "AS_PATH". This route is then selected by the TRIP route selection process and stored in the "Local_TRIB" table. If no route exists, then the LS executes a standard selection process or some other local policy;

if the "AS_PATH" attribute is of the "AS_SEQUENCE" type (i.e. ordered), then the LS extracts the identifier of the first AS in the list, i.e. the identifier of the next As, written ASid. The LS then searches amongst the routes towards DEST, that are contained in its Adj_TRIB_In table, the routes for which the next IP connectivity provider is identical to ASid. This route is then stored in the "Local_TRIB" table. If no route exists, then the LS executes a standard selection process or some other local policy.

3. Example Implementation

Figure 6:
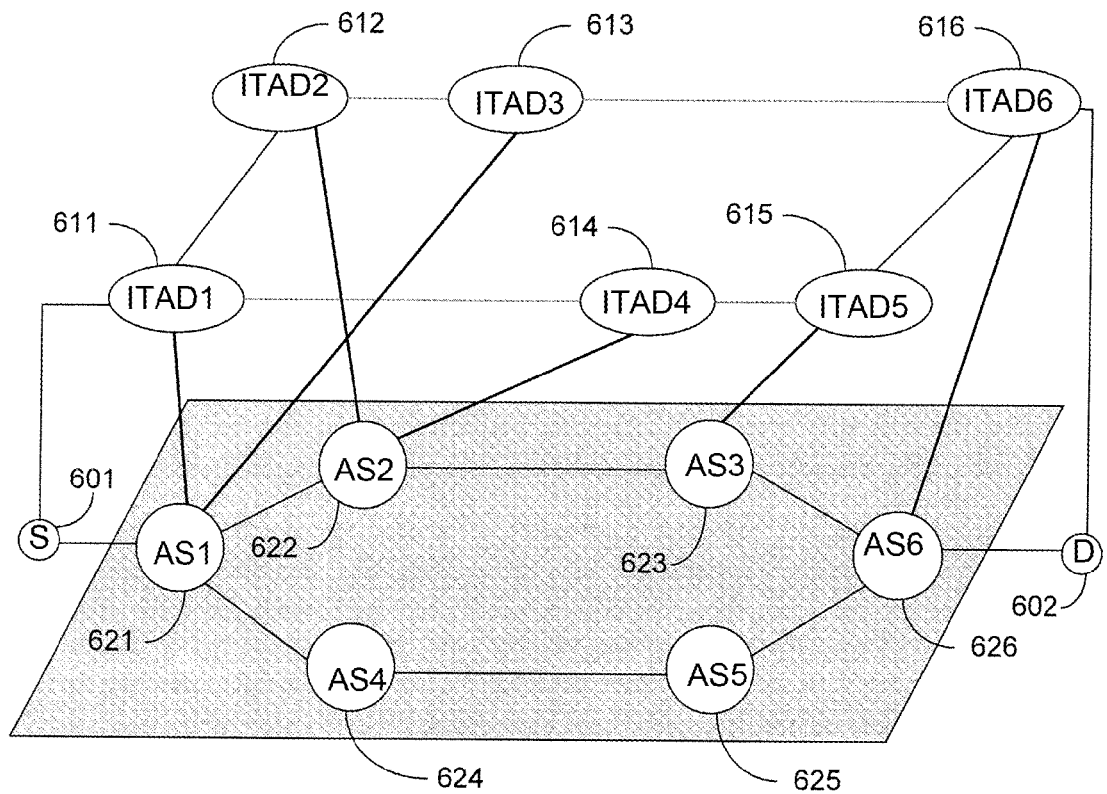
FIG. 6 shows an example of synchronization implemented with the help of the method of an embodiment of the invention.

To illustrate the synchronization procedure, consideration is given to the example shown in FIG. 6. It is assumed that ITAD1 611 uses AS1 621 to deliver its voice traffic, that ITAD2 612 uses AS2 622, that ITAD3 613 uses AS1 621, that ITAD4 614 uses AS2 622, that ITAD5 615 uses AS3 623, and that ITAD6 616 uses AS6 626.

It is assumed that in order to reach D 602 form S 601, the AS path selected by an inter-domain routing protocol is AS1, AS2, AS3, AS6 (621, 622, 623, 626). It is also assumed that all of the ITADs apply the above-described procedure.

ITAD6 advertises its prefixes to ITAD5 and ITAD3;

ITAD3 and ITAD5 do not have any routes other than those received from ITAD6 for serving the prefixes of ITAD6, including D. Consequently, ITAD3 and ITAD5 store these routes in their local TRIBs and advertise (by means of update messages) these prefixes to ITAD4 (from ITAD5) and to ITAD2 (from ITAD3);

the same procedure applies to ITAD4 and ITAD2 going on from ITAD3 and ITAD5. These ITAD4 and ITAD2 propagate the prefixes of ITAD6 to ITAD1;

ITAD1 receives two routes for serving the same prefixes, it consults the local routing table cache provided by AS1 to find the route going towards the identifier of ITAD6 as selected by the inter-domain routing protocol. This request returns the path {AS2, AS3, AS6}. Thus, ITAD1 selects the TRIP route received from ITAD4 and stores it in its local TRIB table.

This ensures that the transfer and service planes are synchronized.

4. Mechanism for Identifying the ASes Taken on a Given Route

To enable quality of service parameters to be transferred and to enable quality of service routes to be selected, a new attribute is introduced that contains information about the list of ASes passed through for routing voice traffic. More clearly, an embodiment of the invention enables the service layer to identify the ASes or the IP connectivity operators used for the voice traffic.

Knowing and propagating such information at LS level then enables numerous applications and optimizations to be performed in TRIP protocol management. For example, in a particular implementation, this information can improve quality of service. Furthermore, and still because of this information, an LS possesses means that are simple and effective for optimizing an end-to-end path for a given destination. This same information also makes it possible to detect anomalies, such as IP spirals, for example, since the service layer knows which ASes the data passes through.

The present application describes solely the principle of enabling information or identifiers relating to the IP layer to rise to a higher layer. A list of identifiers relating to the IP layer is obtained and is then propagated between the LSes used by the ITADs.

More precisely, a novel attribute is described below that contains an AS number. It enables the IP connectivity provider to be identified at transport layer level for the purpose of routing voice. This number is provided to an administrative management domain (ITAD) that forwards it to a neighboring domain.

This document describes an implementation based on location servers LS. It should be understood that this is merely an example. In particular, an embodiment of the invention can perfectly well be implemented using proxy servers.

4.1 Format

Conventionally, it is recalled that the TRIP protocol is implemented by the location servers (LSes) that propagate TRIP routes containing attributes enabling the routes in question to be particularized.

More precisely, the standard version of the TRIP protocol (set out in detail in document RFC3219 by Rosenberg et al.: "Telephony routing over IP (TRIP)", January 2002) makes provision for routing information to be exchanged between two neighboring LSes via the update message, which comprises a certain number of attributes.

In order to know the list of IP connectivity service providers used for conveying voice traffic of an ITAD, a new attribute is introduced called AS_PATH. This attribute comprises the following attributes:
  conditional mandatory: true
  TRIP type code: to be defined by IANA
  conditional mandatory: this attribute indicates whether the attribute in question must be or need not be filled in a TRIP message
  TRIP type code: a unique identifier for the TRIP message in question.

The purpose of this attribute is to create and store a list of the ASes passed through in order to reach the destination in question. In other words, it is an attribute of the service layer that contains information relating to the transport layer. It is then propagated from one IP telephony domain (ITAD) to a neighboring IP telephony domain.

The AS_PATH attribute is made up of a sequence of "AS path" segments or fields. Each "AS path" segment is made up of a triplet <path segment type, path segment length, path segment value>, defined as follows:
  Each "path segment type" has a length of one octet and can take the following values:

| Value | Type of segment |
|---|---|
| 1 | AS_SET: a non-ordered series of ASes passed through by a route contained in a TRIP update message |
| 2 | AS_SEQUENCE: an ordered series of ASes passed through by a route contained in a TRIP update message |

Each "path segment length" has a length of one octet and contains the number of ASes contained in the "path segment value".
  The "path segment value" field contains one or more AS numbers, each encoded as a field having a length of two octets.

This new attribute thus gives the succession of ASes that is passed through by the data associated with a call.

4.2 Procedure

It is recalled that each operator has one or more LSes. Each LS maintains a routing table that it feeds up with the advertisements received from neighbors and form LEes within in its own domain. These advertisements are updated and redistributed to other neighbors if the agreements allow for that to be done.

According to an embodiment of the invention, when an LS propagates a TRIP route that it learned from an update message from some other, neighboring LS, provision is made for it to modify the new AS_PATH attribute of the route depending on the type of LS to which it is to repropagate the route, using the following procedure.

When a given LS advertises the route to another peer LS TRIP situated in its own ITAD, the LS does not modify the AS_PATH attribute associated with this route.

If the LS to which the route is to be advertised (peer LS) is not situated in the same ITAD, two situations can arise for updating the AS_PATH attribute:
  if the first AS_PATH segment is of the AS_SEQUENCE type, the local system adds the number of its IP connectivity service provider as the last element in the sequence;
  if the first segment of the AS_PATH is of the AS_SET type, the local system adds a new segment of AS_SEQUENCE type to the beginning of the AS_PATH; this new segment contains the domain number of its IP connectivity service provider.

If the LS has originated the advertisement, then it includes the number of its own IP connectivity service provider in the AS_PATH attribute of all the update messages for sending to peer TRIPs situated in neighboring ITADs. Furthermore, the LS includes an empty AS_PATH in all update messages for sending to its own peer TRIPs situated in its own ITAD.

Although the present disclosure has been described with reference to one or more examples, workers skilled in the art will recognize that changes may be made in form and detail without departing from the scope of the disclosure and/or the appended claims.

The invention claimed is:
1. A method of selecting an Internet Protocol (IP) telephony route for routing a call to an IP telephony destination, the method being performed within a first location server belonging to a first IP telephony domain deployed on at least one autonomous system, the first location server managing locations of clients of the first IP telephony domain and able to interface with at least one neighboring location server to discover locations of clients managed by other IP telephony domains, each IP telephony domain having an identifier, the method comprising the following steps:

receiving at least one route update message from a second location server, said route update message defining at least one updated IP telephony route comprising a list of identifiers of autonomous systems through which said route update message has passed from said IP telephony destination and a list of IP telephony domains through which said route update message has passed from said IP telephony destination;

extracting from said list of IP telephony domains, the identifier of an IP telephony domain with which said IP telephony destination is associated, referred to as a destination identifier;

obtaining a set of at least one IP telephony route serving said IP telephony destination, as previously stored within said first location server;

searching for at least one IP telephony route for which said IP telephony destination is identical to said destination identifier, referred to as searched-for IP routes;

selecting the IP telephony route within said set of IP telephony routes, for which a list of autonomous systems through which that IP telephony route passes includes the same autonomous system identifiers as said list of autonomous system identifiers of said searched-for IP routes, when such an IP telephony route within the set exists;

selecting the IP telephony route from said set of IP telephony routes when there exists no IP telephony route in the set for which a list of autonomous systems through which that IP telephony route passes includes the same autonomous system identifiers as said list of autonomous system identifiers of said searched-for IP routes, by applying at least one predetermined criterion; and storing said selected IP telephony route.

2. The method according to claim 1, wherein the method includes a step of sending at least one further route update message to another location server, said at least one further route update message defining at least one updated IP telephony route comprising at least one identifier of at least one autonomous system and at least one identifier of at least one IP telephony domain.

3. The method according to claim 1, wherein the method includes the following steps:

receiving said route update message from said second location server, which is situated in said first IP telephony domain.

4. The method according to claim 1, wherein said list of identifiers of autonomous systems is ordered according to at least one predetermined ordering criterion, and said steps of selecting take account of said at least one predetermined ordering criterion.

5. The method according to claim 1, wherein said list of autonomous system identifiers is not ordered, and said steps of selecting take account of a first identifier of said list of autonomous system identifiers.

6. The method according to claim 1, wherein the method includes the following steps:

receiving said route update message from said second location server, which is situated in an IP telephony domain that is different from the first IP telephony domain.

7. An apparatus comprising a computer and a computer program product stored on a computer-readable medium, which form a first location server, wherein the program product comprises instructions for performing a method of selecting an Internet Protocol (IP) telephony route for routing a call to an IP telephony destination when said instructions are executed by the computer, wherein the first location server belongs to a first IP telephony domain deployed on at least one autonomous transfer system, the first location server managing locations of clients of the first IP telephony domain and able to interface with at least one neighboring location server to discover locations of clients managed by other IP telephony domains, each IP telephony domain having an identifier, wherein the method comprises:

receiving at least one route update message from a second location server, said route update message defining at least one updated IP telephony route comprising a list of identifiers of autonomous systems through which said route update message has passed from said IP telephony destination and a list of IP telephony domains through which said route update message has passed from said IP telephony destination;

extracting from said list of IP telephony domains, the identifier of an IP telephony domain with which said IP telephony destination is associated, referred to as a destination identifier;

obtaining a set of at least one IP telephony route serving said IP telephony destination, as previously stored within said first location server;

searching for at least one IP telephony route for which said IP telephony destination is identical to said destination identifier, referred to as searched-for IP routes;

selecting the IP telephony route within said set of IP telephony routes, for which a list of autonomous systems through which that IP telephony route passes includes the same autonomous system identifiers as said list of autonomous system identifiers of said searched-for IP routes, when such an IP telephony route within the set exists;

selecting the IP telephony route from said set of IP telephony routes when there exists no IP telephony route in the set for which a list of autonomous systems through which that IP telephony route passes includes the same autonomous system identifiers as said list of autonomous system identifiers of said searched-for IP routes, by applying at least one predetermined criterion; and storing said selected IP telephony route.

8. A computer program product stored on a non-transitory computer-readable medium and comprising program code instructions for executing a method of selecting an IP telephony route for routing a call to an IP telephony destination, when executed on a computer, the method being performed within a first location server belonging to a first IP telephony domain deployed on at least one autonomous system, the first location server managing locations of clients of the first IP telephony domain and able to interface with at least one neighboring location server to discover locations of clients managed by other IP telephony domains, each IP telephony domain having an identifier, wherein the method comprises the following steps:

receiving at least one route update message from a second location server, said route update message defining at least one updated IP telephony route comprising a list of identifiers of autonomous systems through which said route update message has passed from said IP telephony destination and a list of IP telephony domains through which said route update message has passed from said IP telephony destination;

extracting from said list of IP telephony domains, the identifier of an IP telephony domain with which said IP telephony destination is associated, referred to as a destination identifier;

obtaining a set of at least one IP telephony route serving said IP telephony destination, as previously stored within said first location server;

searching for at least one IP telephony route for which said IP telephony destination is identical to said destination identifier, referred to as searched-for IP routes;

selecting the IP telephony route within said set of IP telephony routes, for which a list of autonomous systems through which that IP telephony route passes includes the same autonomous system identifiers as said list of autonomous system identifiers of said searched-for IP routes, when such an IP telephony route within the set exists; and selecting the IP telephony route from said set of IP telephony routes when there exists no IP telephony route in the set for which a list of autonomous systems through which that IP telephony route passes includes the same autonomous system identifiers as said list of autonomous system identifiers of said searched-for IP routes, by applying at least one predetermined criterion.

* * * * *